(12) United States Patent
Jambu et al.

(10) Patent No.: US 11,200,153 B2
(45) Date of Patent: *Dec. 14, 2021

(54) EXPERIMENTATION IN INTERNET-CONNECTED APPLICATIONS AND DEVICES

(71) Applicant: Optimizely, Inc., San Francisco, CA (US)

(72) Inventors: Vijay Jambu, Dublin, CA (US); John Provine, San Francisco, CA (US); Rama Ranganath, Tiburon, CA (US); Ali Abbas Rizvi, San Francisco, CA (US)

(73) Assignee: Optimizely, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/286,463

(22) Filed: Feb. 26, 2019

(65) Prior Publication Data

US 2019/0196951 A1 Jun. 27, 2019

Related U.S. Application Data

(63) Continuation of application No. 15/391,697, filed on Dec. 27, 2016, now Pat. No. 10,255,173.

(51) Int. Cl.
*G06F 11/36* (2006.01)
*H04L 29/08* (2006.01)

(52) U.S. Cl.
CPC ...... *G06F 11/3688* (2013.01); *G06F 11/3672* (2013.01); *H04L 67/02* (2013.01); *H04L 67/20* (2013.01); *H04L 67/22* (2013.01)

(58) Field of Classification Search
CPC .. G06F 11/3688; G06F 11/3672; H04L 67/02; H04L 67/20; H04L 67/22
See application file for complete search history.

(56) References Cited

U.S. PATENT DOCUMENTS

| | | | |
|---|---|---|---|
| 6,754,850 B2 | 6/2004 | Grey et al. | |
| 6,934,748 B1* | 8/2005 | Louviere | G06Q 30/02 709/224 |
| 7,231,606 B2 | 6/2007 | Miller et al. | |
| 8,024,615 B2 | 9/2011 | Tarta | |

(Continued)

OTHER PUBLICATIONS

Shari Lawrence Pfleeger, "Experimental design and analysis in software engineering", [Online], pp. 219-253, [Retrieved from Internt on Jul. 31, 2021], <https://link.springer.com/content/pdf/10.1007/BF02249052.pdf>, (Year: 1995).*

(Continued)

*Primary Examiner* — Ziaul A Chowdhury
(74) *Attorney, Agent, or Firm* — Womble Bond Dickinson (US) LLP

(57) ABSTRACT

A content variation experiment system for performing variation testing of web pages is disclosed. A content provider receives requests for a web page undergoing an experiment. The content provider determines a variation from a plurality of variations of the web page to provide to the user. The content provider makes the determination without sending a network request to an experiment definition system used to define the experiment thereby reducing network latency.

19 Claims, 13 Drawing Sheets

FIG. 10

(56) References Cited

U.S. PATENT DOCUMENTS

| | | | | |
|---|---|---|---|---|
| 8,234,632 B1* | 7/2012 | Hugeback | ............ | G06F 11/3495 717/130 |
| 8,296,643 B1* | 10/2012 | Vasilik | ................ | G06F 16/958 715/200 |
| 8,839,093 B1* | 9/2014 | Siroker | ................ | G06F 16/958 715/234 |
| 2006/0064339 A1* | 3/2006 | Allred | ................ | G06Q 30/0201 705/7.29 |
| 2006/0101403 A1 | 5/2006 | Sharma et al. | | |
| 2008/0115110 A1 | 5/2008 | Fliek et al. | | |
| 2008/0140765 A1* | 6/2008 | Kelaita | ................... | H04L 67/20 709/203 |
| 2008/0222653 A1* | 9/2008 | Aaronson | ............ | G06F 11/3476 719/318 |
| 2010/0042935 A1* | 2/2010 | Malden | ................ | G06Q 30/02 715/763 |
| 2010/0064281 A1 | 3/2010 | Kimball et al. | | |
| 2010/0100419 A1* | 4/2010 | Natoli | .................... | G06Q 30/02 705/7.31 |
| 2011/0246540 A1 | 10/2011 | Salman et al. | | |
| 2012/0124372 A1 | 5/2012 | Dilley et al. | | |
| 2013/0013725 A1* | 1/2013 | Scheevel | ............ | H04L 61/6009 709/213 |
| 2014/0156331 A1* | 6/2014 | Cordasco | ......... | G06Q 10/06311 705/7.15 |
| 2016/0124839 A1* | 5/2016 | Mordo | ................ | G06F 11/3664 717/124 |
| 2016/0224400 A1* | 8/2016 | Shafique | ................ | G06F 11/079 |
| 2016/0253763 A1* | 9/2016 | Xu | .......................... | H04L 67/16 705/319 |
| 2017/0046110 A1* | 2/2017 | He | .............................. | G06F 8/38 |
| 2017/0168924 A1 | 6/2017 | Dereszynski et al. | | |
| 2017/0269819 A1 | 9/2017 | Pinpin et al. | | |
| 2017/0308459 A1 | 10/2017 | Sahni | | |
| 2018/0123934 A1 | 5/2018 | Gissing et al. | | |

OTHER PUBLICATIONS

David Leon et al., "Multivariate visualization in observation-based testing", [Online], pp. 116-125, [Retrieved from Internet on Jul. 31, 2021], <https://ieeexplore.ieee.org/stamp/stamp.jsp?tp=&arnumber=870403>, (Year: 2000).*

Ann Schroeder, "Integrated program measurement and documentation tools", [Online], pp. 1-29, {Retrieved from Internet on Jul. 31, 2021], <https://hal.inria.fr/inria-00076331/document>, (Year: 2006).*

* cited by examiner

Edit Experiment 403

Experiment Key

Use this to uniquely identify the experiment in your code.

SHOE_SORT_EXPERIMENT

Description

What is your experiment? State your hypothesis and notes here.

Test different sorting of shoes

Variations

Create one or more variation keys for this experiment.

| Variation Key | Description | | Traffic Distribution | |
|---|---|---|---|---|
| default | Sort by category | | 50 % | Delete 407 |
| SORT_BY_PRICE | Sort by price | 409 | 50 % | Delete |

Add Variation — 405

FIG. 4B

Experiment Code 700

```
# activate user in the experiment
variation = optimizely.activate(' SHOE_SORT_EXPERIMENT ', user_id)

if variation == 'default':
    # execute code for variation default
elif variation == 'SORT_BY_PRICE':
    # execute code for variation SORT_BY_PRICE
else:
    # execute default code
```

Copy

Learn more about implementing your experiment.

Create Experiment

Cancel 703

FIG. 7

EXPERIMENTATION IN INTERNET-CONNECTED APPLICATIONS AND DEVICES

RELATED APPLICATIONS

The present application claims the benefit of U.S. patent application Ser. No. 15/391,697, titled EXPERIMENTATION IN INTERNET-CONNECTED APPLICATIONS AND DEVICES, filed Dec. 27, 2016, the entire contents of which are hereby incorporated by reference.

BACKGROUND

The embodiments described herein pertain to internet-connected applications and devices.

A content variation experiment tests changes to content against one or more different versions of the content. One example of a content variation experiment is a web page variation experiment where an experiment is conducted that tests different variations of web pages. During variation testing of a web page, changes to a web page that produce positive results are determined. The positive results associated with a particular change to a web page validates that the change to the web page should be used in a production version of the web page, for example.

In client-side web content variation experiments, a third-party content provider works with a variation testing system to establish an experiment for one or more web pages of the third-party content provider. When a user requests a web page undergoing an experiment from the third-party content provider, the third-party content provider must communicate with the variation testing system to determine which variation of the web page to provide to the user. Since the third-party content provider must communicate with the variation testing system to determine which version of a web page to provide to the user, unnecessary latency may be added to the web page load time. Furthermore, in conventional variation experiments, the third-party content provider cannot easily make complex changes to the experiment as there is only a limited set of functionality that can be changed client-side on the web page. Client-side web variation testing systems cannot be used to test deeper logic in the third-party's backend such as algorithms or other product features.

BRIEF SUMMARY

The embodiments herein describe a variation experiment environment for performing variation experiments of any content item. Examples of content items include any Internet-connected application, device, or web page. The variation experiment environment includes an experiment definition system and a third-party content provider. The third-party content provider works in conjunction with the experiment definition system to define a variation experiment in the code for the content item provided by the third party content provider. The variation experiment for the content item includes multiple variations of the content item where each variation includes a different change to the content item.

The definition of the variation experiment is stored at the third-party content provider. By storing the definition at the third party content provider, the third-party content provider beneficially minimizes application latency since the third-party content provider does not need to send a network request to the experiment definition system to determine which variation of the content item to provide to a client device requesting the content item. Rather, the third-party content provider itself can determine which variation of the content item to provide to the client device based on the definition of the variation experiment stored at the third-party content provider.

Furthermore, by storing the definition of the experiment at the third-party content provider, the third-party content provider can experiment with complex changes to the functionality of the content item undergoing experimentation. The third-party content provider can directly make revisions to the definition of the experiment that is stored at the third party content provider given that the experiment definition system is incapable of handling the complex changes directly at the experiment definition system.

Features and advantages described in this summary and the following detailed description are not all-inclusive. Many additional features and advantages will be apparent to one of ordinary skill in the art in view of the drawings, specification, and claims hereof.

BRIEF DESCRIPTION OF THE DRAWINGS

FIGS. 4A and 4B are user interfaces for creating the content variation experiment according to one embodiment.

FIG. 7 is a user interface illustrating experiment code created for the content variation experiment according to one embodiment.

The figures depict an embodiment for purposes of illustration only. One skilled in the art will readily recognize from the following description that alternative embodiments of the structures and methods illustrated herein may be employed without departing from the principles described herein.

DETAILED DESCRIPTION

Figure 1:
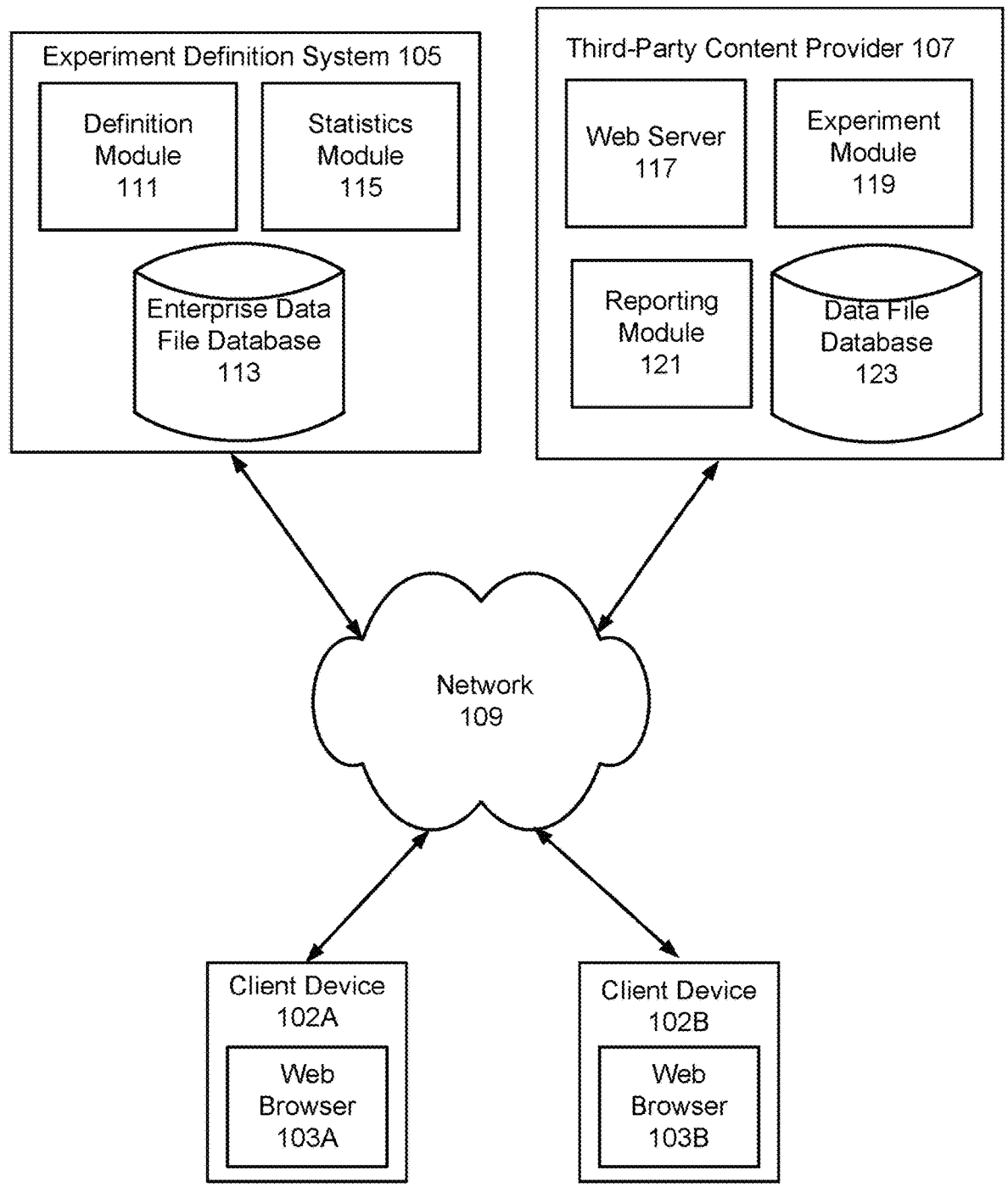
FIG. 1 is a block diagram of a variant experiment system environment according to one embodiment.

FIG. 1 is a block diagram of a variant experiment system environment 100 according to one embodiment. Generally, the variant experiment system environment 100 uses third-party content provider side experiment testing. The definition of a variation experiment is stored at a third-party content provider 107. By storing the definition at the third party content provider 107, the third-party content provider 107 beneficially minimizes application latency at client devices 102 requesting a content item undergoing experimentation since the third-party content provider itself can determine which variation of the content item to provide to the client devices 102. Thus, the third-party content provider 107 does not need to send a network request to an experiment definition system 105 to determine which variation of the content item to provide to a client device 102 requesting the content item. Furthermore, by storing the definition of the experiment at the third-party content provider 107, the third-party content provider 107 can experiment with complex changes to content item functionality of the content item undergoing experimentation.

Environment 100 includes client devices 102 (e.g., client device 102A and client device 102B). Client device 102A may represent one or more devices of a first user and client device 102B may represent one or more devices of a second user. Client devices 102 are connected to an experiment definition system 105 and a third-party content provider 107 via a network 109. Although the environment 100 shown in FIG. 1 only includes two client devices 102, the environment 100 can include any number of client devices (e.g., thousands of client devices 102).

FIG. 1 and the other figures use like reference numerals to identify like elements. A letter after a reference numeral, such as "102A," indicates that the text refers specifically to the element having that particular reference numeral. A reference numeral in the text without a following letter, such as "102," refers to any or all of the elements in the figures bearing that reference numeral.

Network 109 enables communication among the entities connected to it. In one embodiment, network 109 is the Internet and uses standard communications technologies and/or protocols. Thus, network 109 can include links using technologies such as Ethernet, 802.11 (WiFi), worldwide interoperability for microwave access (WiMAX), 3G, Long Term Evolution (LTE), digital subscriber line (DSL), asynchronous transfer mode (ATM), InfiniBand, etc. Similarly, the networking protocols used on network 109 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 109 can be represented using technologies and/or formats including the hypertext markup language (HTML), the extensible markup language (XML), etc. In addition, all or some of links can be encrypted using conventional encryption technologies such as the secure sockets layer (SSL), transport layer security (TLS), virtual private networks (VPNs), Internet Protocol security (IPsec), etc. In one embodiment, network 109 may include but is not limited to any combination of a local area network (LAN), a metropolitan area network (MAN), and a wide area network (WAN). In another embodiment, the entities use custom and/or dedicated data communications technologies instead of, or in addition to, the ones described above.

Client devices 102 communicate with the third-party content provider 107 via the network 109 to receive content items from the third-party content provider 107. In one embodiment, each client device 102 is a computer system capable of communicating with the experiment definition system 105 and the third-party content provider 107. Examples of client devices 102 include a personal computer, a mobile phone, a tablet, a personal digital assistant (PDA), a laptop, a mobile application, a television, an Internet-of-Things (IoT) application. As shown in FIG. 1, each client device 102 includes a web browser 103 (e.g., web browser 103A and web browser 103B) in one embodiment. Web browser 103 is a computer program stored on a client device 102 that allows the user of client 102 to access web pages on the World Wide Web such as web pages provided by the third-party content provider 107. Suitable web browsers include, but are not limited to, GOOGLE CHROME, MICROSOFT INTERNET EXPLORER, MICROSOFT EDGE, MOZILLA FIREFOX, and APPLE SAFARI.

As mentioned above, the environment 100 includes a third-party content provider 107. Hereinafter, the third-party content provider 107 is referred to as a "content provider 107" for ease of description. In one embodiment, the content provider 107 is an entity such as a company. However, the content provider 107 can be an individual or a group of individuals. Generally, the content provider 107 provides content items to client devices 102. While only one content provider 107 is shown, it is understood that any number of content providers are supported and can be in the environment 100 at any time.

In one embodiment, the content items provided by the content provider 107 include web pages, mobile applications, video, audio, a combination of video and audio, still images (e.g., JPEG), text documents, advertisements, or any type of content item that requires backend logic to implement functionality of the content item. The embodiments described herein can be applied to any type of content item. However, the present disclosure is described with respect to a web page provided by the content provider 107 that is undergoing a variation experiment, but is not limited to web page experimentation.

Figure 2:
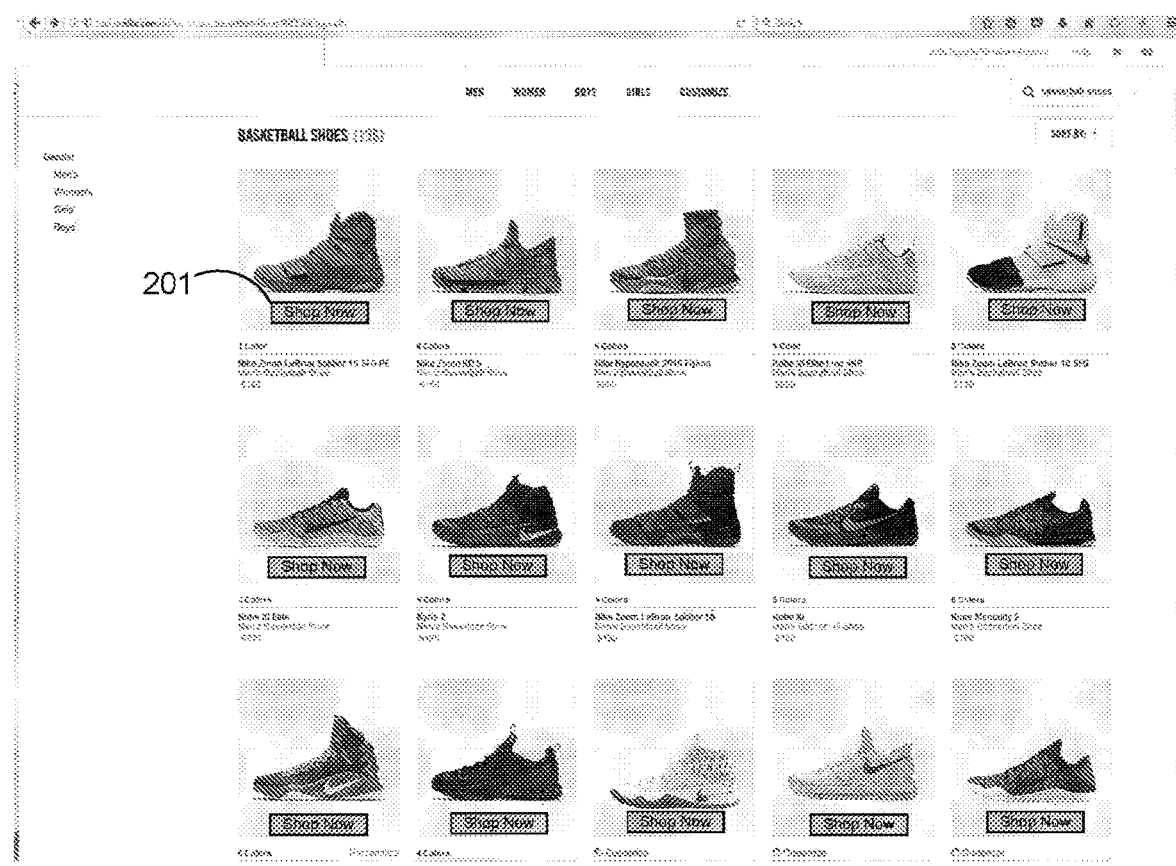
FIG. 2 is an example of a web page undergoing a content variation experiment according to one embodiment.

FIG. 2 illustrates a user interface 200 of a web page provided by content provider 107 where the web page is undergoing a variation experiment. The user interface 200 includes a search result of shoes that is provided to a client device 102 in response to a user search request for "basketball shoes." For purposes of convenience and the description of one embodiment, the content items provided by the content provider 107 will be referred to as web pages, but no limitation on the type of content items are intended by this terminology.

Referring back to FIG. 1, generally the content provider 107 operates in conjunction with the experiment definition system 105 to perform variation experiments on web pages provided by the content provided 107. The experiment definition system 105 defines variation experiments for the content provider 107 where the variation experiment for a web page tests different changes to the web page. By testing the different variations of web page, the content provider 107 determines whether the changes implemented in the variations produce a desired result. Thus, the variation experiment validates any changes made to the web page.

In one embodiment, the specific content included in a web page provided by the content provider 107 is determined using an algorithm implemented at the content provider 107. That is, the content provider 107 may utilize an algorithm to determine what content to include in a web page that is requested by a client device 102. One example of a variation experiment tests how changes to the underlying algorithms operating on the web page affect the goals of the experiment. For example, the content provider 107 may test different ranking criteria used to rank the search results of shoes shown in FIG. 2 to determine which ranking criteria led to the desired result of an increased selection of the "shop now" buttons 201. Alternatively, changes to a web page may be aesthetic changes such as changes to the layout of different elements displayed on the web page.

In one embodiment, the experiment definition system 105 includes a definition module 111. As is known in the art, the term "module" refers to computer program logic utilized to provide the specified functionality. Thus, a module can be implemented in hardware, firmware, and/or software. In one embodiment, program modules are stored on a non-transitory storage device (i.e., a computer program product), loaded into a memory, and executed by one or more computer processors. Additionally, those of skill in the art will recognize that other embodiments of the experiment definition system 105 and content provider 107 shown in FIG. 1 can have different and/or other modules than the ones described here, and that the functionalities can be distributed among the modules in a different manner.

The definition module 111 establishes a definition for a variation experiment of a web page based on attributes provided by the content provider 107. In one embodiment, the definition of a variation experiment includes at least the following attributes provided by the content provider 107:

Experiment key: an identifier for the variation experiment;

Variation key: an identifier for a variation of the web page being tested;

Event key: a conversion metric being optimized; and

Traffic allocation: percentage of user traffic that are assigned to the different variations of the variation experiment.

The definition module 111 receives the definition for a variation experiment of a web page that the content provider 107 wishes to test via user interfaces provided by the experiment definition system 105. FIGS. 3-7 describe different user interfaces provided by the definition module 111 for defining a variation experiment of a web page as described below.

Figure 3:
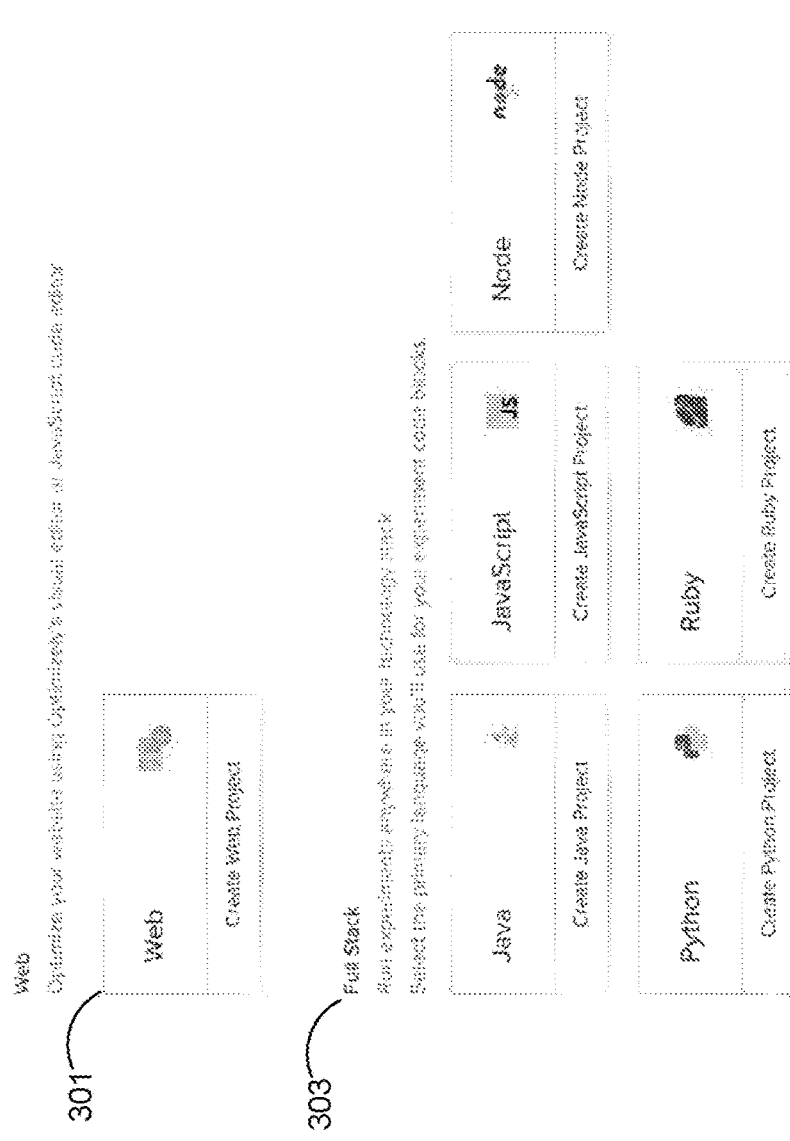
FIG. 3 is a user interface for creating a project for a content variation experiment according to one embodiment.

FIG. 3 illustrates a user interface 300 provided by the definition module 111 to create a project. User interface 300 includes various project types from which a content provider 107 can select from for the content provider's variation experiment. In one embodiment, the project types are classified into projects that include conventional client-side variation experiments or server-side variation experiments.

Examples of conventional client-side variation experiments where experiments are run at the client device 102 include web projects 301 where the variation experiment is optimized for a website using JavaScript. A server-side variation experiment in contrast is a full stack project 303. In one embodiment, a full stack project is a custom project that includes customized code that offers developer software development kits (SDKs) allowing a content provider 107 to conduct a variation experiment at the content provider 107 while tracking events at the experiment definition system 105. Generally, full stack projects 303 are platform-agnostic in contrast to the other types of projects.

If the full stack project 303 is used for the variation experiment, the content provider 107 selects the primary language that will be used for the experiment code blocks for the web page. For example, the content provider 107 may select from various programming languages that will be used to implement the web page including Java, JavaScript, Node, Python, and Ruby. The variation experiment for the web page may be implemented in other programming languages than those shown in FIG. 3 such as PHP, CXX, and ROOT.

In the description herein, the example variation experiment tests different ranking criteria of the results of the web page 200 shown in FIG. 2. Once the content provider 107 selects the programming language that will be used to implement the web page, the definition module 111 receives the type of project selected by the content provider 107. In the example herein, the project being created is a full stack project 307 that implements a content provider-side experiment.

Figure 4A:
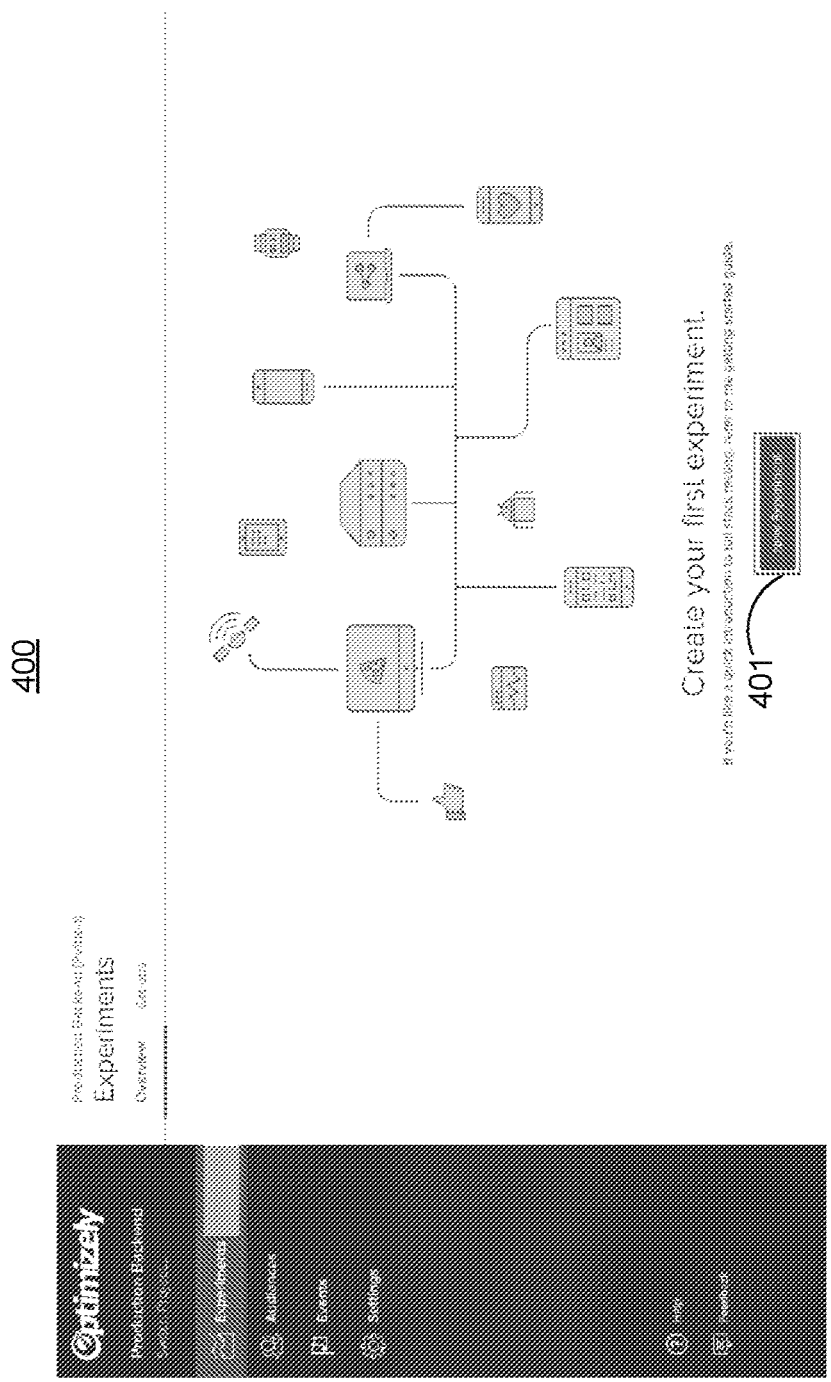

Responsive to receiving a submission of the selected project type (e.g., a full stack project), the definition module 111 provides a user interface 400 for creating the variation experiment for the project as shown in FIG. 4A. The user interface 400 includes a UI element 401 that sends a request to the definition module 111 to create a new experiment responsive to the content provider 107 selecting the UI element 401.

In response to receiving the request to create the new experiment, the definition module 111 provides a screen 403 for the content provider 107 to edit the experiment as shown in FIG. 4B. For example, the content provider 107 defines the experiment key for the variation experiment as shown in FIG. 4B. The experiment key is an identifier for the variation experiment that the content provider 107 will include in the source code or the web page undergoing the experiment. In the example shown in FIG. 4B, the experiment key is "SHOE_SORT_EXPERIMENT." The content provider 107 may optionally include a description of the variation experiment such as the description "Test different sorting of shoes" as shown in FIG. 4B.

The screen 403 for editing the experiment also allows the content provider 107 to define one or more variation keys for the variation experiment as shown in FIG. 4B. A variation key is an identifier for a variation of the web page being tested. A variation experiment includes at least one variation and a corresponding variation key for the variation. In FIG. 4B, the content provider 107 defined the first variation key as "default." The screen 403 also includes an area for optionally providing a description of the variation. In this example, the content provider 107 provided the description that the default variation key tests sorting shoes by category.

The screen 403 also includes a UI element 405 for adding an additional variation key for another variation of the web page. Responsive to the selection of the UI element 405, the definition module 111 updates the screen 403 with text fields where the content provider 107 provides the variation key and optional description for the additional variations for testing. For example, FIG. 4B illustrates that the variation experiment includes a second variation key for the variation experiment for web page 200 in addition to the default variation key. The second variation includes a variation key "SORT_BY_PRICE" for ranking the shoes on web page 200 by price. The content provider 107 may also remove a variation key from the variation experiment by selecting UI element 407.

In one embodiment, the content provider 107 also defines the traffic allocation for each variation key for the variation experiment. The traffic allocation for each variation key defines the percentage of users that are subject to the variation of the variation experiment using UI elements 409 (e.g., text fields). Thus, the content provider 107 may customize the specific distribution of the variations of the web page to the users requesting the web page. For example, the content provider 107 indicated that 50% of the users receive the "default" variation of the web page and 50% of the users receive the "SORT_BY_PRICE" variation of the web page as shown in FIG. 4B.

Figure 5A:
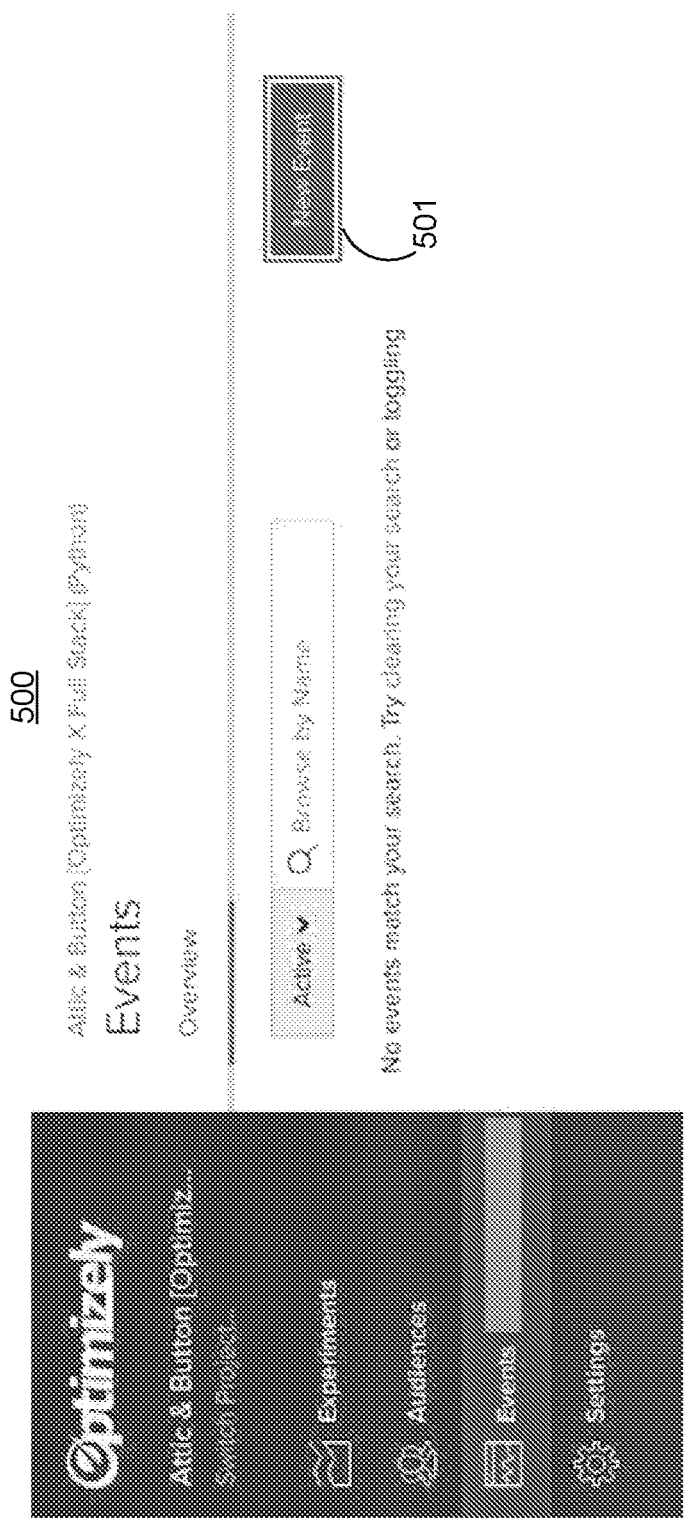
FIGS. 5A, 5B, and 5C are user interfaces for defining events for the content variation experiment according to one embodiment.

After the content provider 107 has completed editing the experiment as shown in FIG. 4B, the definition module 111 provides a screen 500 for defining the events of the experiment as shown in FIG. 5A. An event for the variation experiment indicates at least one metric to track in the variation experiment. In one embodiment, a variation experiment includes at least one event. The content provider 107 may either create a new event via UI element 501.

Figure 5B:
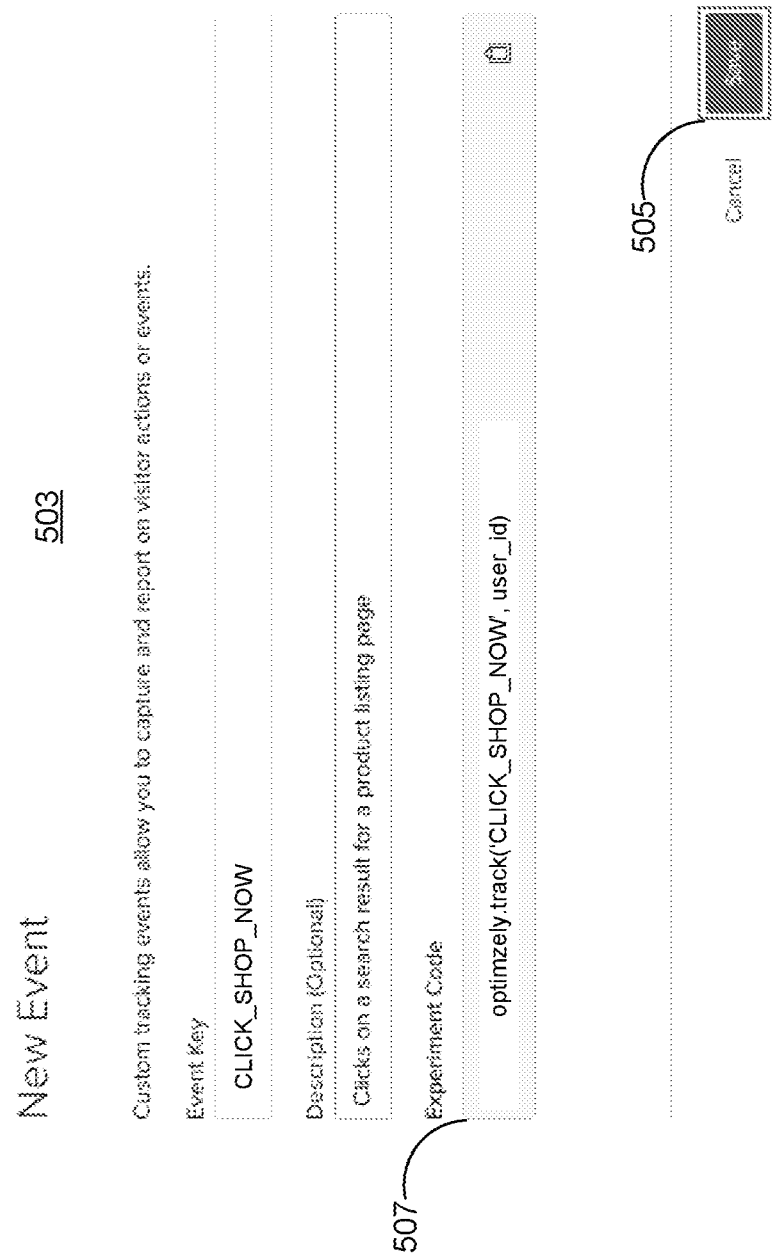
Figure 5C:
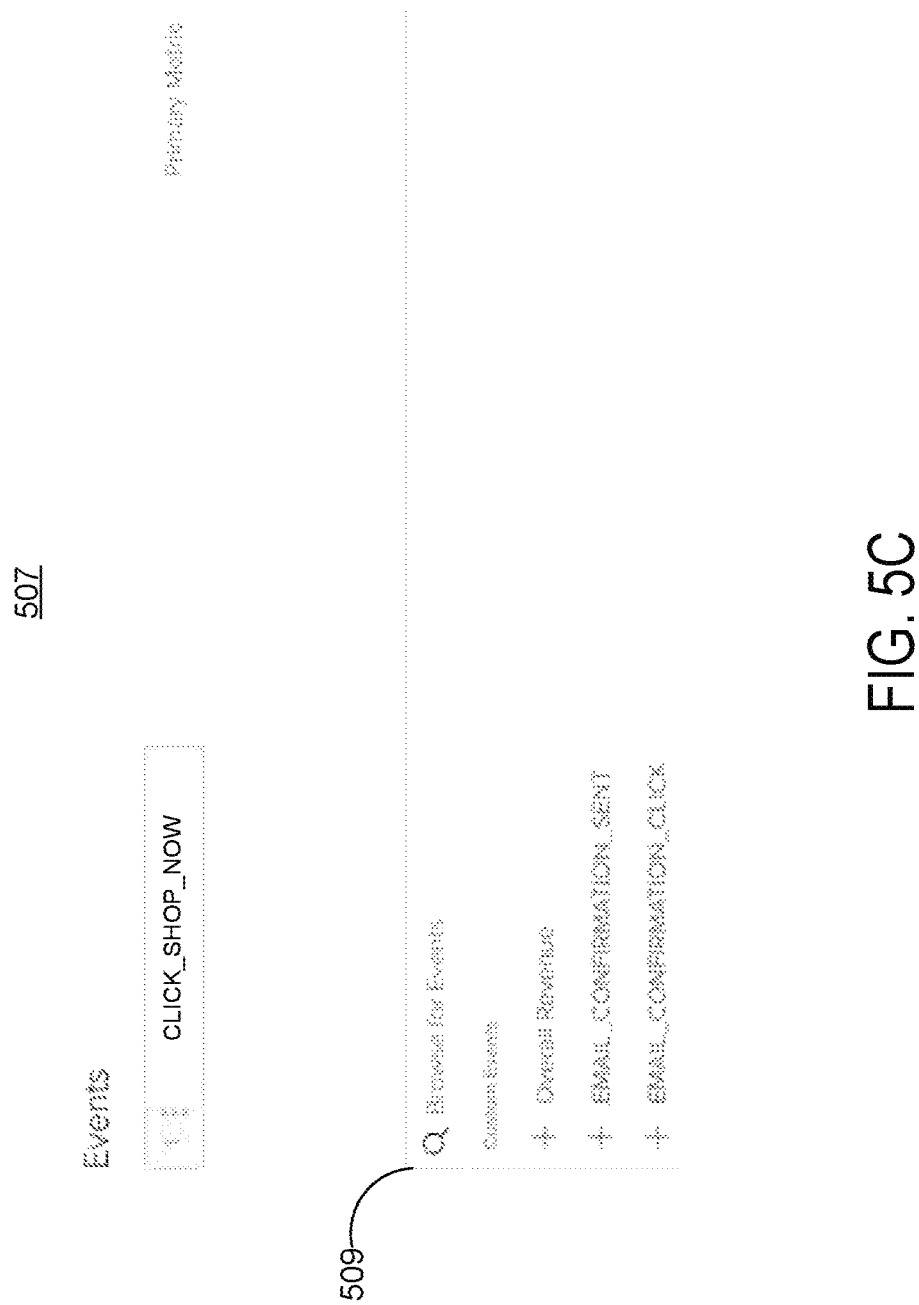

FIG. 5B illustrates screen 503 for defining a new event for the variation experiment. The screen 503 requires the content provider 107 to provide an event key and an optional description of the event key. As mentioned above, the event key indicates the conversion metric being optimized in the variation experiment. In the example described herein, the event key is "CLICK_SHOP_NOW." That is, the goal for the experiment is to determine which variation resulted in the increased selection of the "shop now" buttons 201 shown in FIG. 2. In one embodiment, the definition module 111 also provides a tracking function (e.g., track( )) used for tracking conversion events that occur on the web page being tested given a user ID. The content provider 107 includes the tracking function in the source code of the web page after the activate function has been called for the experiment in the source code. For example, FIG. 5B shows the code block 507 that includes the tracking function which tracks the number of conversions on the web page that are related to the event key. In the example shown in FIG. 5B, the tracking function tracks the number of selections of the "shop now" button 201 included in the different variations of the web page 200 included in the variation experiment. In one embodiment, the definition module 111 provides the code block 507 in the programming language selected by the content provider 107 for the variation experiment Responsive to selecting the UI element 505, the event key and optional event description is created and screen 507 shown in FIG. 5C is displayed that lists the events for the variation experiment. In FIG. 5C, the content provider 107 may also add an additional event by searching for previously defined events using the search UI 509. Thus, the content provider 107 may apply an event previously defined by the content provider 107 to the variation experiment.

Figure 6:
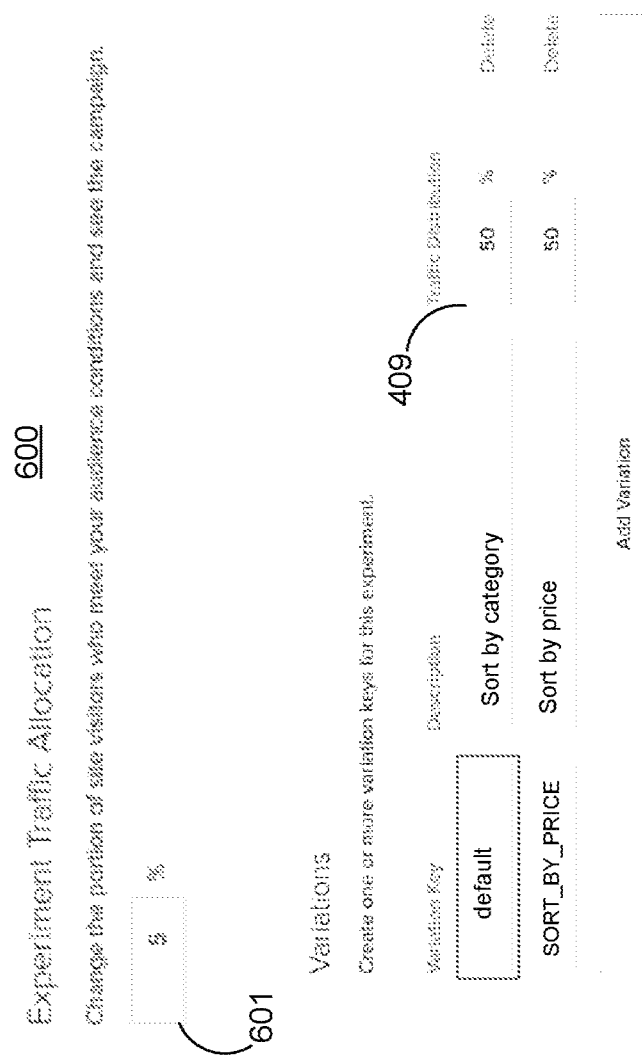
FIG. 6 is a user interface for defining traffic allocation for the content variation experiment according to one embodiment.

If no additional events are required, the definition module 111 provides screen 600 shown in FIG. 6 for defining the traffic allocation for the variation experiment. The traffic allocation describes the percentage of users (e.g., traffic) that are included in the variation experiment. The content provider 107 may define the traffic allocation by using the text field 601. In other embodiments, a slider or other mechanism may be used to specify the traffic allocation for the variation experiment. In the example shown in FIG. 6, 5% of all users requesting the web page 200 are included in the variation experiment.

Additionally, screen 600 also illustrates the percentage of users that are subject to each of the different variations of the variation experiment as defined in FIG. 4B. The content provider 107 may revise the specific distribution of the variations of the web page to the users requesting the web page if needed in screen 600 using UI elements 409. Thus, in the example described herein, 5% of all users that request web page 200 are included in the variation experiment and of those users included in the variation experiment, 50% of the users receive the "default" variation of the web page and 50% of the users receive the "SORT_BY_PRICE" variation of the web page as shown in FIG. 6.

In one embodiment the definition module 111 creates a code block 701 for the content provider 107 to include in the source code of the web page as shown in FIG. 7. The code block 701 includes various functions needed to run the variation experiment and track events on the web page undergoing experimentation. For example, the code block 701 shown in FIG. 7 includes an activate function (e.g., activate( )) that is used to allocate a user to a variation of the variation experiment given the user's user identification (ID). In one embodiment, the activate function may also allocate a user to a given variation based on any specified targeting criteria such as demographic information.

As shown in FIG. 7, the content provider 107 is advantageously provided with code block 701 created by the definition module 111 for the variation experiment. The content provider 107 merely needs to include the code block 701 in the source code for the web page being tested and add in the variation code for each of the different variations being tested. In this example, the content provider 107 is required to provide the code that describes what occurs if the user is assigned to the default variation or the variation that sorts by price. In one embodiment, the definition module 111 provides the code block in the programming language selected by the content provider 107 in FIG. 3. For example, if the content provider 107 is implementing the web page in Java, the code block 701 is provided in Java.

In one embodiment, the definition module 111 receives optional targeting attributes from the content provider 107 based on attributes of the users requesting the web page. Attributes can include for example demographic information about the users, interest information about users, geographic information about users, and any type of information related to users. The attributes allow the experiment to targeting a particular audience. For example, the content provider 107 can determine whether to include or exclude a user from an experiment based on the user's attributes in comparison with the targeting attributes received from the content provider. If a user's attributes match the targeting attributes for the experiment, the content provider 107 may include the user in the experiment for example.

After reviewing the code block 701, the content provider 107 creates the experiment by selecting UI element 703. In one embodiment, the definition module 111 includes the attributes of the variation experiment in an experiment definition file. The experiment definition file represents all of the "instructions" needed for the content provider 107 to activate the variation experiment in the source code of the web page undergoing experimentation and track events on the web page. In one embodiment, the experiment definition file is a JavaScript Objection Notation (JSON) representation of the attributes of the variation experiment.

In one embodiment, definition module 111 sends the experiment definition file for the variation experiment to the associated content provider 107. As will be discussed below, the content provider 107 stores the experiment definition file locally and therefore does not need to communicate with the experiment definition system 105 when conducting the variation experiment. The definition module 111 may optionally store the experiment definition file associated with the experiment and the content provider in the enterprise data file database 113 shown in FIG. 1. The enterprise data file database 113 stores the experiment definition files of different variation experiments established using the experiment definition system 105.

Figure 8:
FIG. 8 is a user interface showing the status of the content variation experiment according to one embodiment.

If the variation experiment does not require any further events and the content provider 107 has established the code for the web page including the code blocks created by the definition module 111, the content provider 107 starts the experiment by selecting UI element 703 shown in FIG. 7. Once the variation experiment is started, the experiment is live and users requesting the web page are automatically routed to one of the experiments and the events of the experiment are tracked. For example, FIG. 8 illustrates that the status of the experiment is "running" indicating that the experiment is live. The experiment can also be paused by the content provider 107 at any time.

Referring back to FIG. 1, the experiment definition system 105 also includes a statistics module 115. The statistics module 115 calculates statistics regarding the events of the variation experiment. The statistics module 115 receives from the content provider 107 events that occur on the web page being tested as described in the experiment definition file for the experiment and the statistics module 115 calculates statistics related to the received events. Events can be any type of interaction with the web page such as merely providing the web page to unique viewers or any interactions with elements related to the events of the experiment that are being tracked on the web page such as the "shop now" button in FIG. 2.

In one embodiment, the statistics module 115 receives events from the content provider 107 in real time as the events are received on the web page if network connectivity to the content provider 107 is available. Alternatively, the statistics module 115 periodically receives events in a batch of events if the experiment definition system 105 has network connectivity to the content provider 107. If the experiment definition system 105 lacks network connectivity to the content provider 107, the experiment definition system 105 receives the events at a later time when network connectivity is available.

Figure 9:
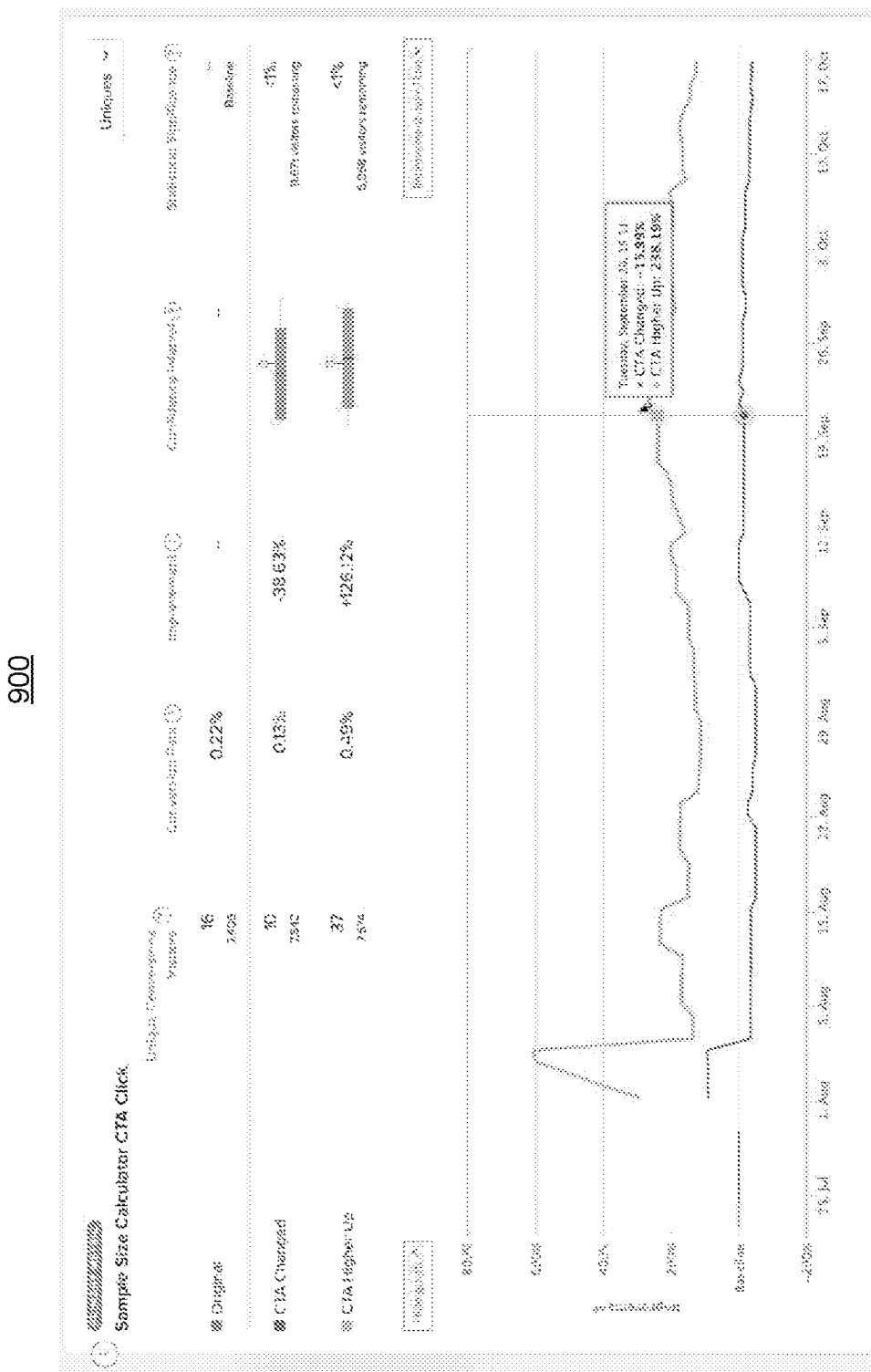
FIG. 9 is a user interface illustrating statistics of the content variation experiment according to one embodiment

FIG. 9 illustrates a UI 900 of the performance summary of the variation experiment on web page 200 that is provided to the content provider 107 via the experiment definition system 105. The performance summary provides a summary of the statistics of the variation experiment calculated by the statistics module 115. For example, the performance summary indicates the number of unique visitors that received the web page 200, the number of visitors directed to each of the different variations of the web page 200, and the percentage of conversions (e.g., selection of the "shop now" button) that occurred on each variation of the web page.

Referring back to FIG. 1, in one embodiment the content provider 107 includes a web server 117, an experiment module 119, a reporting module 121, and a data file database 123. The data file 123 database 117 stores experiment definition files of the content provider's variation experiments defined on the experiment definition system 105. The content provider 107 receives an experiment definition file for a variation experiment from the experiment definition system 105 after the content provider 107 defines the variation experiment on the experiment definition system 105 as described above.

In one embodiment, the web server 117 links the content provider 107 to one or more client devices 102 and the experiment definition system 10 105 via the network 109. The web server 117 serves content items such as web pages, as well as other web related content, such as Java, Flash, XML, and so forth. The web server 117 may include a mail server or other messaging functionality for receiving and routing messages between the experiment definition system 105 and one or more client devices 102.

The experiment module 119 conducts a variation experiment on a web page hosted by the content provider 107 according to the associated experiment definition file stored in the data file database 123. The experiment module 119 receives requests for a web page that is undergoing an experiment from client devices 102. The experiment module 119 determines whether to include a user requesting the web page in the variation experiment based on the traffic allocation specified in the experiment definition file for the experiment. In the example variation experiment discussed herein, the traffic allocation indicates to include all users requesting the web page in the variation experiment. Thus, the experiment module 119 includes any user requesting the web page in the experiment.

The experiment module 119 also determines which variation to provide to the client device 102 of the user. In one embodiment, the experiment module 119 includes a SDK received from the experiment definition system 105 that is installed at the content provider 107. The SDK includes the code for the activation function and tracking function.

As discussed earlier, the source code for the web page being tested includes a call to the activate function which allocates a user to a variation based on a given user ID. In one embodiment, the experiment module 119 randomly assigns the user to one of the variations of the web page using the SDK while satisfying the specified allocation of the number of users that should be directed to each variation as defined in the experiment definition file. For example, the experiment definition file for the shoe demo indicates that 33.33% of all users should be directed to the default variation, 33.33% of all users should be directed to the "SORT_BY_PRICE" variation, and 33.33% of all users should be directed to the "SORT_BY_REVIEWS" variation of the web page. The experiment module 119 may randomly assign the user to one the variations while satisfying the specified allocation of users to each variation. The experiment module 119 then provides the determined version of the web page to the client device 119 and tracks events related to the web page according to the experiment definition file.

Since the experiment definition file for the variation experiment is stored at the content provider 107, the content provider 107 does not need to make a network request to the experiment definition system 105 to determine which variation of the web page to provide to the client device 102. Given that the content provider 107 does not need to communicate with the experiment, the content provider 107 beneficially minimizes application latency, which could translate to web page load time in the web page example described herein. Furthermore, the content provider 107 can decide which variations to provide to client devices 102 as soon as the requests for web pages are received by the content provider 107 thereby reducing latency. For example, 10 ms is saved each time a user requests a web page undergoing an experiment since the content provider 107 does not need to send a network request to the experiment definition system 105 to determine which variation of the web page to provide to the user.

In one embodiment, the experiment module 119 tracks events on the web page provided by the content provider 107. The events describe various actions related to the web page such as each request for the web page from a unique visitor. The events may also describe user interactions with the web page. Specifically, the experiment module 119 tracks events describing user interactions with objects on the web page that are related to the goals of the experiment. For example, the experiment module 119 tracks the number of selections of the "shop now" UI element in FIG. 2.

Furthermore, the experiment module 119 may revise the attributes of a variation experiment in the experiment definition file stored in the data file database 123. Since the experiment definition file for a variation experiment is stored at the content provider 107, the content provider 107 is given the flexibility to easily change any of the attributes of the variation experiment without having to communicate with the experiment definition system 105. The content provider 119 merely makes the revision to the source code of the web page and any corresponding revisions to the experiment definition file for the variation experiment. For example, if the content provider 109 wants to change the variation experiment to sort the results based on shoe color rather than sort by reviews of shoes, the content provider 109 updates the source code for the web page with the code for the revised sorting algorithm and revises the variation key and traffic allocation according to the change. Thus, the content provider 107 is allowed to test complex changes that occur at the content provider 107 which would be impossible in conventional client-side variation testing.

In one embodiment, the reporting module 121 reports events related to variation experiments to the experiment definition system 105. The reporting module 121 may send the events to the experiment definition system 105 in real time as the events are received on the web page or periodically in a batch of events if the content provider 107 has network connectivity to the experiment definition system 105. If the content provider 107 lacks network connectivity to the experiment definition system 105, the reporting module 121 sends the events to the experiment definition system 105 at a later time when network connectivity is available.

Although the description herein is applied to a variation experiment applied to a web page, the embodiments of the present disclosure are applicable to any type of content items where it is desirable to test back end logic or algorithms. For example, a content item may be a mobile application that ranks search results of automobiles for sale. The content provider 107 may have different variations of the mobile application that each operate using a different algorithm to rank automobiles based on different ranking criteria. The embodiments herein may be used to test which of the different variations of the mobile application produced desired results.

In another example, the content item may be a digital media player provider by the content provider 107. The digital media player may stream content to users such as videos, television, movies, etc. The content provider 107 may provide different variations of the digital media player that each implement a different algorithm used to determine which content to provide to users for example. The embodiments herein may be used to text which of the different variations of the digital media player produced the desired results.

Thus, a variation experiment can be performed on any type of content item using the embodiments herein where the definition of the variation experiment is stored by the content provider 107 that provides the content item. By storing the definition at the content provider 107, the content provider 107 beneficially minimizes application latency since the content provider 107 does not need to send a network request to the experiment definition system to determine which variation of the content item to provide to a client device requesting the content item.

Providing Variations of Web Pages

Figure 10:
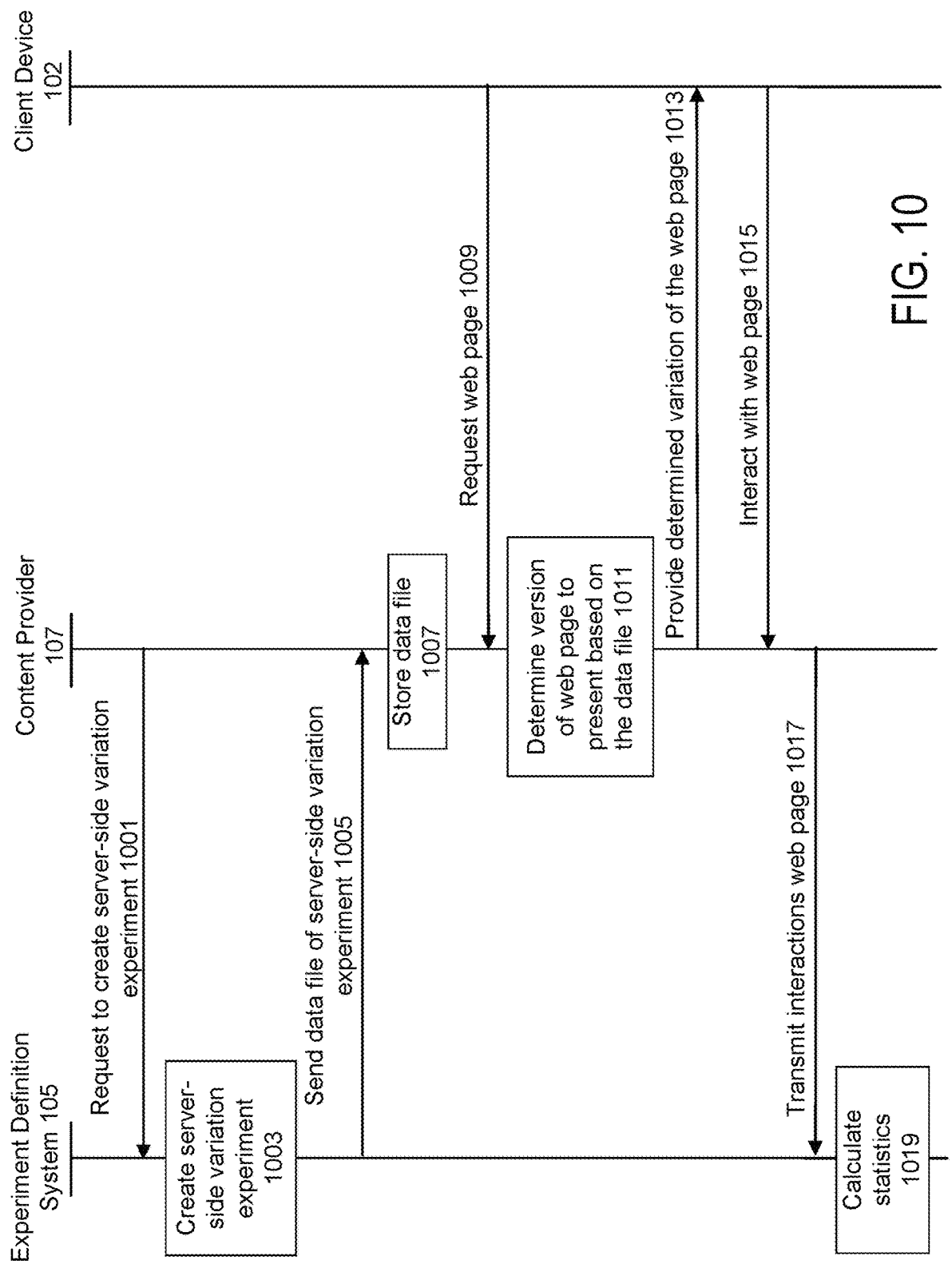
FIG. 10 is an interaction diagram of a process for providing a variation of a web page to a client device according to one embodiment.

FIG. 10 is an interaction diagram of a process for providing a variation of a web page to a client device 102A according to one embodiment. The interaction diagram illustrates the steps performed by client device 102, content provider 107, and experiment definition system 105 according to one embodiment.

In one embodiment, the content provider 107 transmits 1001 a request to create a content provider-side variation experiment to the experiment definition system 105. The experiment definition system 105 creates 1003 the content provider-side variation experiment as described above. For example, the experiment definition system 105 creates an experiment definition file for the variation experiment that includes the attributes of the experiment provided by the content provider 107. The experiment definition system sends 1005 the experiment definition file for the content provider-side variation experiment to the content provider 107. The content provider 107 stores 1007 the experiment definition file for the content provider-side variation experiment.

The content provider 107 receives 1009 a request for a web page undergoing the experiment from the client device 102. The content provider 107 determines 1011 the version of the web page to present to the client device 102 based on the experiment definition file. Since the experiment definition file is stored at the content provider 107, the content provider 107 does not need to make a network request to the experiment definition system 105 to determine which variation to provide to the client device 102. Rather, the content provider 107 itself can determine which variation of the web page to provide to the client device 102.

The content provider 107 provides 1013 the determined variation of the web page to the client device 102. The client device 102 interacts 1015 with the web page and the interactions are sent to the content provider 107. For example, the client device 102 selects the "shop now" UI element on web page 200. The content provider 107 receives the interaction with the shop now UI element and transmits 1017 the interactions with the web page to the experiment definition system 105. The experiment definition system 105 calculates 1019 statistics based on the interactions received from the content provider 107. The content provider 107 can view the calculated statistics via a user interface provided by the experiment definition system 105.

Additional Considerations

The foregoing described embodiments have been presented for the purpose of illustration; they are not intended to be exhaustive or to limiting to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, described modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may include one or more general-purpose computing devices selectively activated or reconfigured by one or more stored computer programs. A computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Described embodiments may also relate to a product that is produced by a computing process described herein. Such a product may include information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method, comprising:
    receiving, by a computer processor of a content provider system, information generated on an experiment definition system;
    determining, by the computer processor of the content provider system, a variation of a content item from a plurality of different variations of the content item to provide to a client device without communicating with the experiment definition system, the determination based on an experiment definition file stored on the content provider system and the information generated on the experiment definition system, the information allocates users requesting the content item to one of the plurality of different variations of the content item;
    including, by the computer processor of the content provider system, the information in the content item; and
    providing, by the computer processor of the content provider system, the determined variation of the content item to the client device.

2. The method of claim 1, wherein the content item is a web page.

3. The method of claim 1, wherein the content item is a mobile application.

4. The method of claim 1, wherein the content item is one or more of a video file, an audio file, an image file, text document, and an advertisement.

5. The method of claim 1, further comprising:
    receiving, from the experiment definition system, the experiment definition file; and
    storing the experiment definition file received from the experiment definition system, the experiment definition file describing the attributes of the variation experiment for the content item.

6. The method of claim 5,
    wherein the attributes include a definition for each of the plurality of different variations of the content item.

7. The method of claim 1, further comprising:
    tracking events associate with the content item; and
    reporting the tracked events to the experiment definition system.

8. The method of claim 7, further comprising;
    transmitting a request for statistics associated with the variation experiment of the content item to the experiment definition system; and
    receiving the statistics associated with the variation experiment of the content item from the experiment definition system, the statistics calculated based on the tracked events reported to the experiment definition system.

9. A non-transitory computer-readable storage medium storing executable code that when executed by a computer processor, cause the computer processor to:
    receive information generated on an experiment definition system;
    determine a variation of a content item from a plurality of different variations of the content item to provide to a client device without communicating with the experiment definition system, the determination based on an experiment definition file stored on a content provider system and the information generated on the experiment definition system, the information allocates users requesting the content item to one of the plurality of different variations of the content item;
    include the information in the content item; and
    provide the determined variation of the content item to the client device.

10. The non-transitory computer-readable storage medium of claim 9, wherein the content item is a web page.

11. The non-transitory computer-readable storage medium of claim 9, wherein the content item is a mobile application.

12. The non-transitory computer-readable storage medium of claim 9, wherein the computer processor further to:
    receive, from the experiment definition system, the experiment definition file; and
    store the experiment definition file received from the experiment definition system, the experiment definition file describing the attributes of the variation experiment for the content item.

13. The non-transitory computer-readable storage medium of claim 12, wherein
    the attributes include a definition for each of the plurality of different variations of the content item.

14. The non-transitory computer-readable storage medium of claim 9, wherein the computer processor further to:
    track events associate with the content item; and
    report the tracked events to the experiment definition system.

15. The non-transitory computer-readable storage medium of claim 9, wherein the computer processor further to:
    transmit a request for statistics associated with the variation experiment of the content item to the experiment definition system; and
    receive the statistics associated with the variation experiment of the content item from the experiment definition system, the statistics calculated based on the tracked events reported to the experiment definition system.

16. A content provider computer system, comprising:
    a computer processor to:
        receive information generated on an experiment definition system;
        determine a variation of a content item from a plurality of different variations of the content item to provide to a client device without communicating with the experiment definition system, the determination based on an experiment definition file stored on the content provider computer system and information generated on the experiment definition system, the information allocates users requesting the content item to one of the plurality of different variations of the content item;
include the information in the content item; and
provide the determined variation of the content item to the client device.

17. The content provider computer system of claim 16, wherein the content item is a web page.

18. The content provider computer system of claim 16, wherein the content item is a mobile application.

19. The content provider computer system of claim 16, wherein the computer processor further to:
receive, from the experiment definition system, the experiment definition file; and
store the experiment definition file received from the experiment definition system, the experiment definition file describing the attributes of the variation experiment for the content item.

* * * * *